US012570277B2

(12) United States Patent  
Lee et al.

(10) Patent No.: US 12,570,277 B2  
(45) Date of Patent: Mar. 10, 2026

(54) LATERAL MOVEMENT SYSTEM FOR COLLISION AVOIDANCE

(71) Applicants: HYUNDAI MOTOR COMPANY, Seoul (KR); Kia Corporation, Seoul (KR)

(72) Inventors: Tae Young Lee, Yongin-si (KR); Young Bin Min, Busan (KR); Hyung Min Ko, Suwon-si (KR); Jong Hyeok Park, Seosan-si (KR); Jae Woong Choi, Seoul (KR); Byeong Hyeok Min, Hwaseong-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 333 days.

(21) Appl. No.: 17/831,102

(22) Filed: Jun. 2, 2022

(65) Prior Publication Data

US 2022/0388502 A1      Dec. 8, 2022

(30) Foreign Application Priority Data

Jun. 3, 2021      (KR) ........................ 10-2021-0072312

(51) Int. Cl.  
*B60W 30/09* (2012.01)  
*B60W 30/18* (2012.01)

(52) U.S. Cl.  
CPC ....... *B60W 30/09* (2013.01); *B60W 30/18163* (2013.01); *B60W 2520/10* (2013.01); *B60W 2520/12* (2013.01); *B60W 2530/201* (2020.02); *B60W 2540/18* (2013.01); *B60W 2540/215*

(2020.02); *B60W 2552/53* (2020.02); *B60W 2554/802* (2020.02); *B60W 2720/10* (2013.01)

(58) Field of Classification Search  
None  
See application file for complete search history.

(56) References Cited

U.S. PATENT DOCUMENTS

| | | | | |
|---|---|---|---|---|
| 2005/0090950 A1* | 4/2005 | Sawamoto | ............. | G08G 1/166 |
| | | | | 701/28 |
| 2017/0190330 A1* | 7/2017 | Kelly | .................... | B60W 30/02 |
| 2017/0327110 A1* | 11/2017 | Inoue | .................... | B60W 10/20 |
| 2018/0178783 A1* | 6/2018 | Saiki | .................... | B60W 30/09 |
| 2019/0202450 A1* | 7/2019 | Maeda | .................. | B60W 30/09 |
| 2019/0263344 A1* | 8/2019 | Yokoi | ................. | B60W 30/095 |
| 2020/0108825 A1* | 4/2020 | Kim | ..................... | G06V 20/58 |

(Continued)

FOREIGN PATENT DOCUMENTS

| | | |
|---|---|---|
| EP | 1 990 250 A2 | 11/2008 |
| EP | 3 536 575 A2 | 9/2019 |

OTHER PUBLICATIONS

Extended European Search Report issued in corresponding European Patent Application No. 22175975.6 dated Oct. 27, 2022.

*Primary Examiner* — James J Lee  
*Assistant Examiner* — Jonathan E Reinert  
(74) *Attorney, Agent, or Firm* — MORGAN, LEWIS & BOCKIUS LLP

(57) ABSTRACT

The present disclosure relates to an autonomous vehicle system or a driver assistance system that detects an object in front of the vehicle, judges whether a condition calls for an operation of a lateral movement system for collision avoidance, determines a direction of the lateral movement, and executes the lateral movement.

10 Claims, 11 Drawing Sheets

(56)  References Cited

U.S. PATENT DOCUMENTS

| 2020/0180618 | A1* | 6/2020 | Ohmura | ................ | B60W 50/12 |
| 2020/0247397 | A1* | 8/2020 | Kim | ...................... | B60W 10/18 |
| 2021/0024059 | A1* | 1/2021 | Miyamoto | ............ | B60W 10/20 |

* cited by examiner

Figure 3:
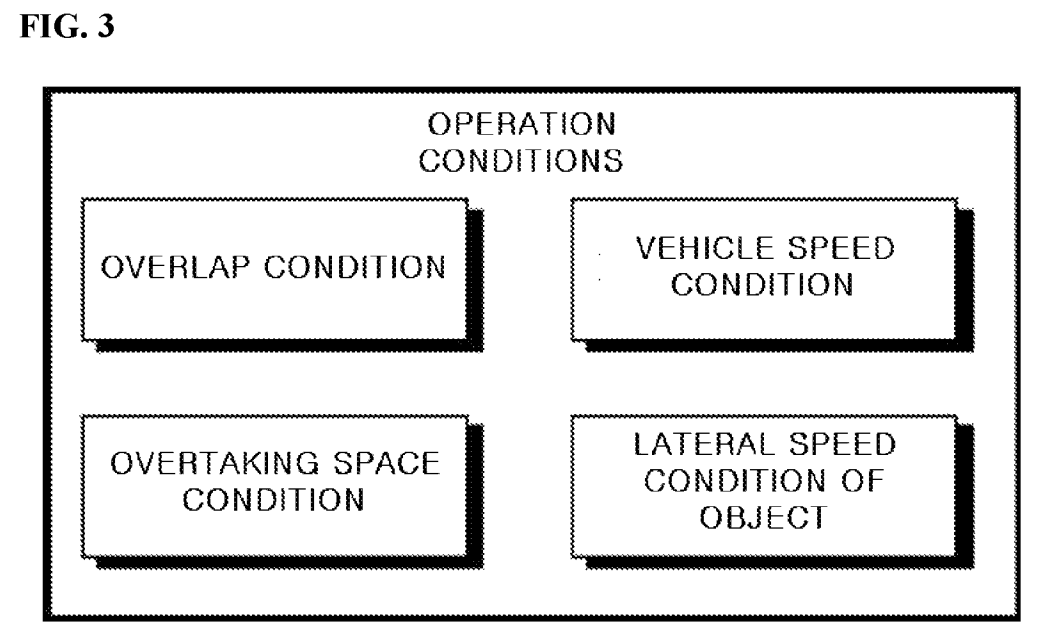

OPERATION CONDITIONS

OVERLAP CONDITION

OVERTAKING SPACE CONDITION

VEHICLE SPEED CONDITION

LATERAL SPEED CONDITION OF OBJECT

FIG. 5

| Categories | Minimum requirements |
|---|---|
| Low speed | Vmin ≤ 12 [m/s]<br>Vmax ≥ 13 [m/s]<br>Also, there shall be a range of 5.5m/s or more between Vmin and Vmax |
| High speed | Vmin ≤ 17 [m/s]<br>Vmax ≥ 20 [m/s]<br>Also, there shall be a range of 5.5m/s or more between Vmin and Vmax |

FIG. 7
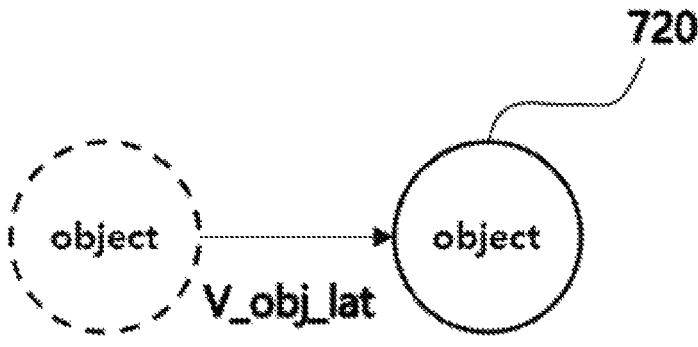
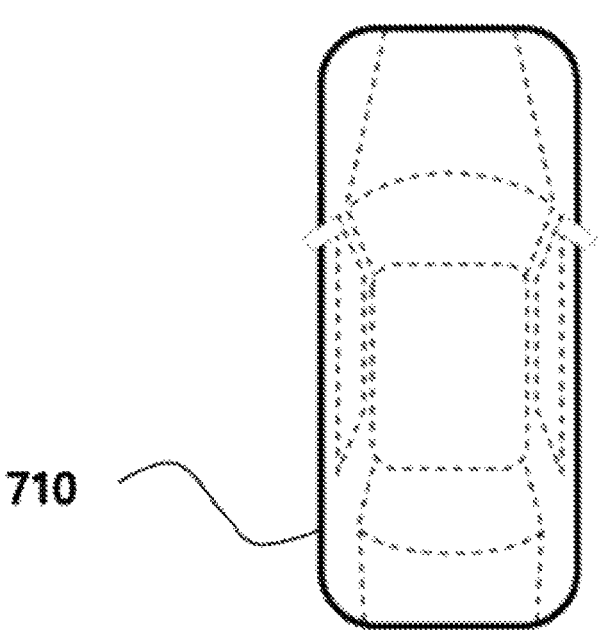

FIG. 8

| direction determination | 1. steer to right if distance between object and right line is bigger than distance between object and left line |
| | 2. steer to left if distance between object and right line is smaller than distance between object and left line |
| | 3. steer to the direction where other objects do not exist |
| | 4. steer to opposite direction to the yellow line (central line) |
| | 5. steer to opposite direction to where moving object exists |
| | 6. steer to the direction where low speed lane exists (if Left hand driving regulation, it may be right) |
| | 7. steer to the direction where the driver intends to |

FIG. 10

| Categories | type 1 | type 2 |
|---|---|---|
| definition | the system is initiated automatically | the system is initiated by driver's trigger |
| operation condition | at least one of:<br>1.overlap condition<br>2.SV's speed condition<br>3.overtaking space condition<br>4.object's lateral speed condition | at least one of:<br>1.overlap condition<br>2.SV's speed condition (V_max is higher than type 1)<br>3.overtaking space condition |
| direction determination | at least one of:<br>1. steer to right if distance between object and right line is bigger than a distance between object and left line<br>2.steer to left if distance between object and right line is smaller than a distance between object and left line<br>3. steer to that direction where other objects do not exist<br>4.steer to opposite direction to the yellow line (central line)<br>5. steer to opposite direction to where moving object exists<br>6. steer to the direction where low speed lane exists (if Left hand driving regulation, it may be right) | steer to the direction where the driver intends to |
| lateral movement | amount of lateral movement is restricted<br>1.if there is lane marking the lateral movement is restricted within the lane<br>2.if there is no lane marking, the maximum lateral movement is limited to a predetermined value | amount of lateral movement is not restricted |

FIG. 11

STATE CHANGES

SYSTEM OFF STATE

SYSTEM STAND-BY STATE

SYSTEM ACTIVE STATE (1)

(2)

(3)

(4)

(5)

LATERAL MOVEMENT SYSTEM FOR COLLISION AVOIDANCE

CROSS REFERENCE TO RELATED APPLICATIONS

This application claims the benefit under 35 USC § 119 (a) of Korean Patent Application No. 10-2021-0072312 filed on Jun. 3, 2021 in the Korean Intellectual Property Office, the entire disclosure of which is incorporated herein by reference for all purposes.

BACKGROUND

An autonomous driving system or driver assistance system refers to a system in which a vehicle drives itself without intervention by a driver or a system that intervenes in driving of a driver to assist the driving. Such an autonomous driving system or driver assistance system detects an object by monitoring a forward view, judges a situation based on the sensing result, and controls the vehicle behavior based on the judgment of the situation. For example, a sensor device mounted in a vehicle may detect a forward object and perceive lane markings. Thereafter, a processor mounted in the vehicle judges whether a situation calls for control of the vehicle behavior by the autonomous driving system or driver assistance system: In addition, the processor mounted in the vehicle determines a method of controlling the vehicle behavior and outputs control commands to other devices (for example, a brake, a steering wheel, and the like) that perform the control of the vehicle behavior.

On the other hand, a system that allows avoidance of collision with an object present in front typically includes an autonomous emergency brake (AEB), a forward vehicle collision mitigation system (FVCMS), a pedestrian detection and collision mitigation system (PDCMS), and the like.

SUMMARY

The present disclosure relates to an autonomous vehicle system or a driver assistance system, and more particularly, to a system for detecting an object in front of a traveling vehicle, judging whether a condition calls for an operation of a lateral movement system for collision avoidance, determining a direction of lateral movement, and executing the lateral movement.

The aforementioned AEB system, FVCMS, and PDCMS aim to avoid a collision with a forward object but do not consider the level of risk of collision with the object. That is, the AEB system activates the brake when it is judged that there is a possibility of collision with the forward object but does not consider the level of collision possibility. FVCMS or PDCMS also activates steering or bake when it is judged that there is a possibility of collision with an object but do not consider the level of collision possibility.

An object of the present disclosure is to provide an autonomous driving system or driver assistance system that allows avoidance of a collision with a forward object by steering manipulation alone through a judgment on the level of risk or possibility of collision with a forward object, unlike the AEB system, FVCMS, and PDCMS.

The present disclosure provides a lateral movement system for collision avoidance, and the system includes a plurality of sensors detecting a forward object; a processor judging an operation condition of the system based on information about the detected forward object, determining a direction of lateral movement, and outputting a lateral movement command based on the determined direction of lateral movement; and an actuator executing lateral movement of a vehicle upon receiving the lateral movement command.

The operation condition includes a lateral speed condition of the object to be satisfied when the lateral speed of the object is lower than a predetermined speed.

The processor outputs a command to control the vehicle to decelerate when the speed of the vehicle is higher than a maximum speed, so that the speed of the vehicle becomes equal to or lower than the maximum speed.

The vehicle includes a first type in which the system is automatically initiated without a trigger of a driver and a second type in which the system is initiated based on a trigger of a driver.

The operation condition includes a vehicle speed condition to be satisfied when the vehicle movement speed is equal to or higher than a minimum speed and equal to or lower than the maximum speed, wherein the maximum speed set in the second type is higher than the maximum speed set in the first type.

The processor of the first type vehicle determines the direction of lateral movement based on at least one of the determining of an operation direction to be a direction having a greater distance of the distances from a sensed object to a left lane marking and a right lane marking; the determining of an operation direction to be a direction in which, when another object in addition to a target object is detected, the another object is not present; the determining of an operation direction to be a direction away from a center marking line; when another moving object in addition to the target object is detected, the determining of an operation direction to be a direction away from a direction of the another moving object; and the determining of an operation direction to be a direction toward a low-speed driving lane.

The processor of the second type vehicle determines the direction of lateral movement based on the driver's steering manipulation direction alone.

The processor of the first type vehicle outputs a lateral movement command to restrict the lateral movement within a limited range not to cross a lane marking when there is a lane marking and outputs a lateral movement command to control the lateral movement to be less than a predetermined movement amount when there is no lane marking.

A state of the processor includes at least one of a system off state, a system-standby state, and a system active state.

According to the present disclosure, when the risk or possibility of collision with a forward object is judged, and a collision with the object may be avoided by generating a lateral movement of the vehicle alone when the risk or possibility of a collision is low.

In addition, according to the present disclosure, the vehicle is controlled only when the risk or possibility of collision is low and the controlling generates a lateral movement of the vehicle so that a collision with an object may be avoided with minimal vehicle control alone.

BRIEF DESCRIPTION OF THE DRAWINGS

FIG. 1 is a block diagram showing components of a vehicle according to the present disclosure.

FIG. 3 is a view showing operation conditions of a lateral movement system for collision avoidance according to the present disclosure.

FIG. 5 is a view for describing a vehicle speed condition according to the present disclosure.

FIG. 7 is a view for describing a lateral speed condition of an object according to the present disclosure.

FIG. 8 is a view for describing an operation direction determination according to the present disclosure.

FIG. 10 is a view for describing two types of lateral movement systems for collision avoidance.

FIG. 11 is a block diagram for describing state changes of a lateral movement system for collision avoidance according to the present disclosure.

DETAILED DESCRIPTION

Figure 2:
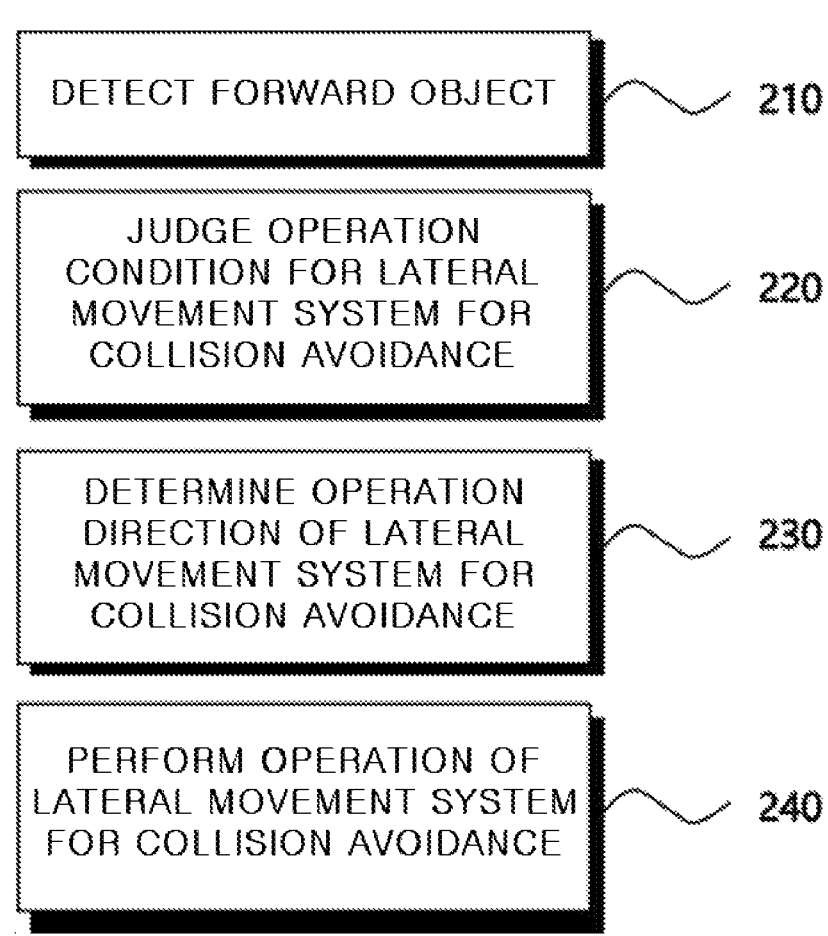
FIG. 2 is a block diagram showing operations of a lateral movement system for collision avoidance according to the present disclosure.

Hereinafter, exemplary embodiments of the present disclosure will be described in detail with reference to the accompanying drawings so that those skilled in the art to which the present disclosure pertains may readily embody the present disclosure. The present disclosure may be implemented in various forms different from each other and is not limited to the embodiments described herein.

Parts irrelevant to the description are omitted for the sake of a clear description of the present disclosures, and the same reference numerals are assigned to the same or similar components throughout the specification.

Throughout the specification, when a part is referred to as being "connected" to another part, a case where the parts are "directly connected" as well as a case where the parts are "electrically connected" with another element in between is included. Also, when a part is referred to as "including" a component, it means that the part may further include other components rather than exclude other components unless otherwise stated. When a part is referred to as being "over" another part, the part may be directly over the another part or other parts may be involved in between. Contrarily, when a part is "directly over" another part, no other part is involved in between.

Terms such as first, second, and third are used to describe various parts, components, regions, layers, and/or sections but are not limited thereto. These terms are only used to distinguish one part, component, region, layer, or section from the other part, component, region, layer, or section. Accordingly, a first part, component, region, layer, or section may be referred to as a second part, component, region, layer, or section as long as they do not deviate from the scope of the present disclosure.

The terminology used herein is for referring to specific embodiments only and is not intended to limit the present disclosure. The singular forms used herein also include plural forms unless the phrases clearly indicate the contrary. The term "including" used in the specification is meant to specify a specific characteristic, region, integer, step, operation, element, and/or component and is not meant to exclude the presence or addition of another characteristic, region, integer, step, operation, element, and/or component.

Terms indicating relative spaces such as "under", "over", and the like may be used to more easily describe the relationship of one part to another part as shown in a drawing. These terms are intended to include other meanings or operations of the device in use along with the meanings intended in the drawing. For example, if a device in the drawing is turned over, some parts described as being "under" other parts are described as being "over" the other parts. Accordingly, the illustrative term "under" includes both of the up and down directions. The device may be rotated 90 degrees or at another angle and the term indicating relative space is understood accordingly.

Unless defined otherwise, all terms including technical and scientific terms used herein have the same meaning as those generally understood by those skilled in the art to which the present disclosure pertains. The terms defined in the dictionaries in common use are further understood to have meanings consistent with the content of the related technical literature and the present disclosure and are not understood to have idealistic or very formal meanings unless so defined.

Hereinafter, exemplary embodiments of the present disclosure will be described in detail with reference to the accompanying drawings so that those skilled in the art to which the present disclosure pertains may readily embody the present disclosure. The present disclosure may be implemented in various forms different from each other and is not limited to the embodiments described herein.

Figure 1:
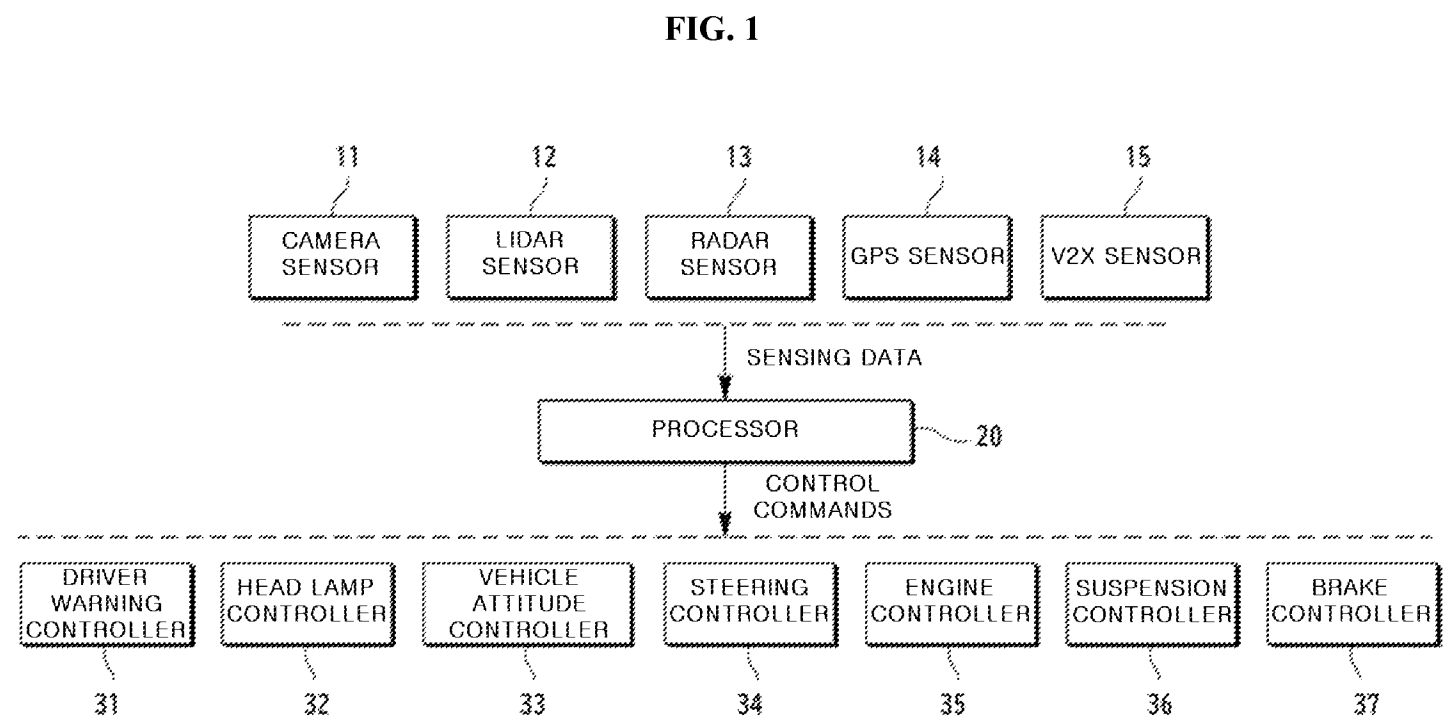

FIG. 1 is a block diagram showing components of a vehicle according to the present disclosure.

FIG. 1 shows sensors 11 to 15 capable of sensing, or communicating with, the front and surrounding of a vehicle, a processor 20 receiving sensing data from the sensors 11 to 15 and judging a situation, and controllers 31 to 37 performing the control of the vehicle behavior upon receiving a control command from the processor 20.

A camera sensor 11 is a device sensing an image of a subject captured through a lens, processing the sensed image, and outputting processed image data. The camera sensor 11 may include an image sensor and an image processor. Such a camera sensor 11 may sense a forward view, a side view, and a backward view. For this, a plurality of camera sensors 11 may be mounted in the vehicle.

A lidar sensor 12 may be composed of a laser transmission module, a laser detection module, a signal collection and processing module (e.g., a processor), and a data transmission module, and a light source of the laser has a wavelength in a wavelength range of 250 nm to 11 μm or a laser light source with a tunable wavelength may be employed. In addition, the lidar sensor 12 is classified by signal modulation methods, i.e., a time of flight (TOF) method and a phase shift method. The lidar sensor 12 is typically employed to sense a forward region of a vehicle. The lidar sensor 12 is located on the inner front of the vehicle—under the windshield to be specific—or mounted on the outer front of the vehicle—inside the grill of the vehicle, to be specific—and transmits and receives the laser light. However, the lidar sensor 12 is not limited thereto, may be mounted at other locations, and may sense another region (a side region or a backward region) of the vehicle.

A radar sensor 13 is a sensor device using electromagnetic waves to measure a distance to, and a speed and angle of, an object. The radar device may employ a frequency modulation carrier wave (FMCW) method or a pulse carrier method and may detect an object up to 150 m ahead in a range of 30 degrees horizontally. The radar sensor 13 uses a 77 GHz band radar or other appropriate band and senses the forward, backward, and side regions of a vehicle. The information acquired by the radar sensor 13 may be used for ADAS technology such as adaptive cruise control (ACC).

A GPS sensor 14 is a device capable of detecting the position and measuring the speed of a vehicle and time communicating with a satellite. Specifically, the GPS sensor 14 is a device that measures the delay time of radio waves emitted from the satellite and obtains the current position from the distance to the orbit.

A V2X sensor 15 is a device executing vehicle-to-vehicle communication (V2V), vehicle-to-infrastructure communication (V2I), and vehicle-to-mobile communication (V2M). The V2X sensor 15 may include a transceiver capable of transmitting and receiving radio frequencies. An example of V2X communication may include a radio communication method such as 4G/LTE, 5G, Wi-Fi, Bluetooth, and the like. The V2X sensor 15 may receive information such as location, movement speed, and the like of other vehicles for example, may receive traffic information such as traffic congestion, occurrence or non-occurrence of an accident ahead, and the like for example, and may receive entertainment information such as video streaming, music streaming, news, and the like for example.

The processor 20 is a device processing the sensing data received from the sensors 11 to 15. For example, the processor 20 may be a microcontroller unit (MCU). When the sensors 11 to 15 detect a forward object, the processor 20 according to the present disclosure may judge whether the situation calls for control of the vehicle behavior upon receiving the sensing data. In addition, the processor 20 may determine a method of controlling the vehicle behavior. The controlled vehicle behavior may include a movement direction, and more specifically, may include a movement to the right or a movement to the left. In addition, the processor 20 may output a control command to the controllers 31 to 37 performing the control of the vehicle behavior. The processor 20 according to the present disclosure not only may judge the possibility of collision with a forward object but also may judge whether the collision possibility is high or low and may judge that the situation calls for control of the vehicle behavior when the collision possibility is low. Accordingly, a collision with an object may be avoided by generating a lateral movement of the vehicle alone, and since just the lateral movement of the vehicle is generated, a collision with an object may be avoided with minimal vehicle control alone.

The controllers may include a driver warning controller 31, a head lamp controller 32, a vehicle attitude controller 33, a steering controller 34, an engine controller 35, a suspension controller 36, a brake controller 37, and the like.

The driving warning controller 31 may generate an audio, video, or haptic warning signal to warn the driver of a specific dangerous situation. For example, the driver warning controller 31 may output a warning sound using a sound system of the vehicle. Alternatively, the driver warning controller 31 may output a warning message through a HUD display or a side mirror display to display a warning message. Alternatively, the driver warning controller 31 may operate a vibration motor mounted in the steering wheel to generate a warning vibration.

The head lamp controller 32 may control a head lamp positioned on the front of a vehicle to secure the driver's view over the front of the vehicle at night. For example, the head lamp controller 32 performs high beam control, low beam control, right and left auxiliary lamps control, adaptive head lamp control, and the like.

The vehicle attitude controller 33 is referred to as a vehicle dynamic control (VDC) or an electronic stability control (ESC) and may perform control by which an electronic device intervenes to correct the vehicle behavior when the vehicle behavior is suddenly destabilized due to an emergency steering manipulation by the driver or a road surface condition. For example, when the sensors such as a wheel speed sensor, a steering angle sensor, a yaw rate sensor, and a cylinder pressure sensor sense a mismatch between the steering wheel and the driving direction of the wheels through the sensing of the steering wheel manipulation, the vehicle attitude controller 33 performs control of distributing the brake force of the respective wheels using the anti-lock braking system (ABS) and the like.

The steering controller 34 performs control of the motor-driven power steering system (MPDS) that drives the steering wheel. For example, when the vehicle is expected to collide, the steering controller 34 controls the vehicle steering in a direction such that the collision may be avoided or damage is minimized.

When the processor 20 receives data from an oxygen sensor, an airflow sensor, and a manifold absolute pressure sensor, the engine controller 35 performs the role of controlling the configuration of an injector, a throttle, spark plugs, and the like according to a control command from the processor 20.

The suspension controller 36 is a device performing motor-based active suspension control. Specifically, the suspension controller 36 variably controls the damping force of shock absorbers to provide a soft ride during normal driving and a hard ride during high-speed driving and posture change, thereby ensuring riding comfort and driving stability. In addition, the suspension controller 36 may perform vehicle height control, attitude control, and the like in addition to the damping force control.

The brake controller 37 controls the operation and non-operation of the vehicle brake and controls brake pedal force. For example, when a forward collision is expected, the brake controller 37 automatically operates the emergency brake according to a control command of the ECU 320 regardless of whether the driver operates the brake. In addition, the brake controller 37 may control the lateral movement of the vehicle by generating lateral brake control. For example, the vehicle may move to the left when a brake force is generated on the left wheels only by the brake controller 37, and the vehicle may move to the right when the brake force is generated on the right wheels only.

On the other hand, according to the detailed description with reference to the drawing, the sensors, processor, and controllers are respectively described as independent components, but it should be understood that the present disclosure is not limited thereto. Two or more sensors may be integrated into one sensor, two or more sensors may interact with each other, two or more sensors and the processor may be integrated into one device, two or more controllers may be integrated into one controller, two or more controllers may interact with each other, and two or more controllers and the processor may be integrated into one device.

FIG. 2 is a block diagram showing operations of a lateral movement system for collision avoidance.

FIG. 2 shows the lateral movement system for collision avoidance may be configured to detect a forward object (210). The lateral movement system for collision avoidance may include a plurality of sensors, for example. The plurality of sensors may include a camera sensor, a lidar sensor, a radar sensor, a GPS sensor, a V2X, corresponding to those described above, and the like, for example. The forward object may include a moving object such as a person, a car, a cyclist, and the like, and a stationary object such as a parked car, a rockfall, a road sign, and the like, for example.

FIG. 2 shows that the lateral movement system for collision avoidance is configured to judge an operation condition (220). The lateral movement system for collision avoidance may include a processor, for example. As described above, the processor may receive the sensing data obtained by a plurality of sensors detecting a forward object and judge the operation condition based on the received sensing data. This will be described with reference to FIGS. 2 and 3.

FIG. 3 is a view for describing operation conditions of a lateral movement system for collision avoidance according to the present disclosure. The operation condition of the lateral movement system for collision avoidance according to the present disclosure may include at least one of an overlap condition, a vehicle speed condition, an overtaking space condition, and a lateral speed condition of an object.

Specifically, the overlap condition is that the operation condition of the lateral movement system for collision avoidance is satisfied when the ratio of the lateral overlap of the vehicle and the object with respect to the lateral length (overall width) of the vehicle is equal to or greater than a minimum ratio. In addition, the vehicle speed condition is that the operation condition of the lateral movement system for collision avoidance is satisfied when the vehicle movement speed is equal to or higher than a minimum speed and equal to or lower than a maximum speed. In addition, the overtaking space condition is that the operation condition of the lateral movement system for collision avoidance is satisfied when a distance from the object to a lane marking is greater than the lateral length of the vehicle. In addition, the lateral speed condition of the object is that the operation condition of the lateral movement system for collision avoidance is satisfied when the lateral speed of the object is lower than a predetermined speed. In one example, the minimum ratio, the minimum speed, the maximum speed, the predetermined speed may be preset by a vehicle manufacturer or may be based on experiments, tests, or driving data through machine learning, for example.

First, reference will be made to FIG. 4 to describe the overlap condition.

Figure 4:
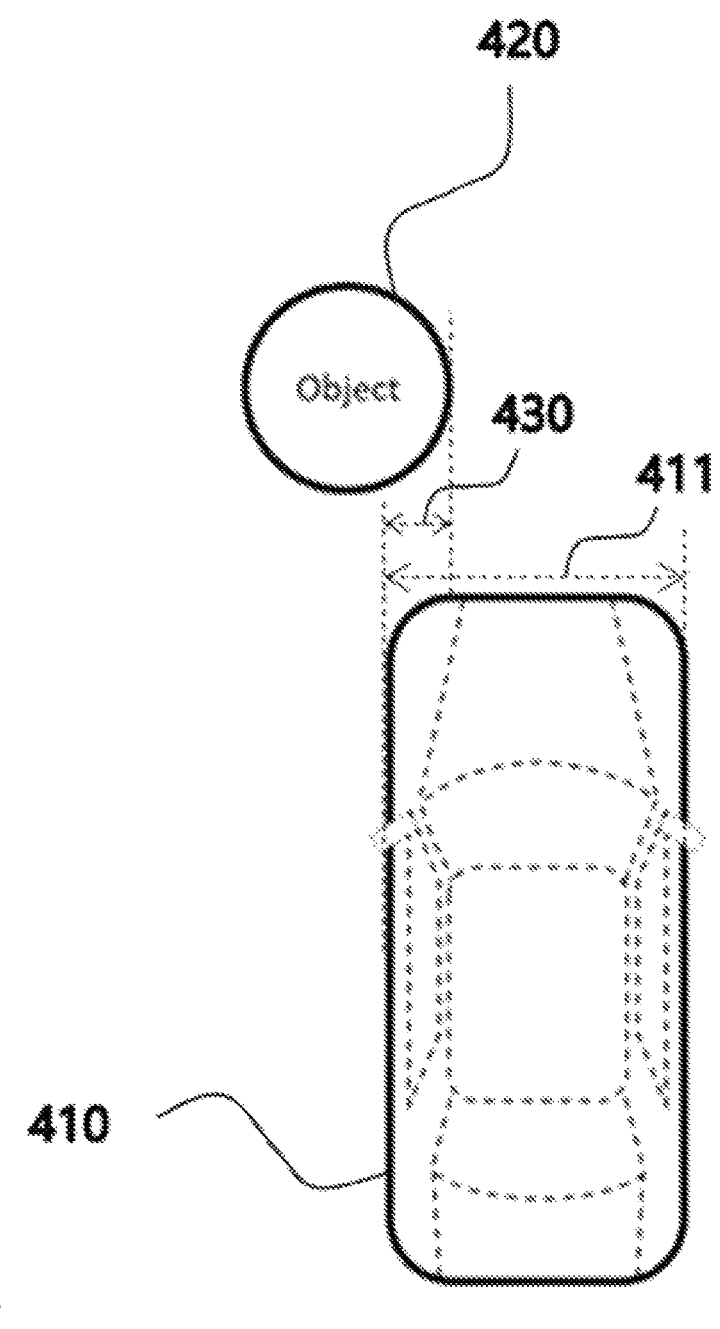
FIG. 4 is a view for describing an overlap condition according to the present disclosure.

FIG. 4 is a view for describing the overlap condition according to the present disclosure. FIG. 4 shows a vehicle 410 and an object 420. The lateral length 411 of the vehicle may be referred to as an overall width. As described above, the overlap condition is that the operation condition of the lateral movement system for collision avoidance is satisfied when the radio of the lateral overlap 430 of the vehicle 410 and the object 420 with respect to the lateral length 411 of the vehicle is equal to or greater than a minimum ratio. That is, the radio may be a value obtained by using the vehicle lateral length 411 as a denominator and the lateral overlap 430 as a numerator. The minimum share may be 10%, for example. The overlap condition proposed by the present disclosure is to prevent unnecessary or excessive lateral movement control. For example, when the minimum ratio is set low or set to 0%, the mere presence of a forward object generates the lateral movement control, thereby compromising the driving convenience of an occupant. However, an excessive lateral movement control may be prevented by setting the minimum ratio to satisfy the overlap condition as in the present disclosure.

Reference will be made to FIG. 5 to describe the vehicle speed condition according to the present disclosure.

FIG. 5 is a view for describing a vehicle speed condition according to the present disclosure. As described above, the vehicle speed condition is that the operation condition of the lateral movement system for collision avoidance is satisfied when the vehicle movement speed is equal to or higher than the minimum speed and equal to or lower than the maximum speed. Specifically, the vehicle speed condition may include a low-speed condition and a high-speed condition. The minimum speed of the low-speed condition may be equal to or lower than 12 m/s and the maximum speed of the low-speed condition may be equal to or higher than 13 m/s. In addition, the difference between the minimum speed and the maximum speed may be equal to or higher than 5.5 m/s. Accordingly, it may be determined that the operation condition of the lateral movement system for collision avoidance is satisfied when the vehicle speed is between the minimum speed (10 m/s, for example) and the maximum speed (16 m/s, for example). The minimum speed of the high-speed condition may be equal to or lower than 17 m/s and the maximum speed of the high-speed condition may be equal to or higher than 20 m/s. Similarly, the difference between the minimum speed and the maximum speed may be equal to or higher than 5.5 m/s. Accordingly, it may be determined that the operation condition of the lateral movement system for collision avoidance is satisfied when the vehicle speed is between the minimum speed (15 m/s, for example) and the maximum speed (21 m/s, for example). The low-speed condition may apply to an inner-city driving situation, for example. The high-speed condition may apply to an expressway driving or suburban driving situation. Unnecessary lateral movement control may be prevented by setting a minimum speed as in the present disclosure. This is because the possibility that the collision damage is low and the object (a pedestrian or other vehicle, for example) actively avoids the collision is high when a vehicle travels at a speed lower than the minimum speed. In addition, other driver assistance systems at a higher level may be activated by setting a maximum speed as in the present disclosure. The lateral movement system for collision avoidance proposed in the present disclosure aims to achieve a movement to pass an object by steering without performing the deceleration braking of the vehicle, and this is to achieve an autonomous/semi-autonomous driving with minimal control before other driver assistance systems (AEV, FVCMS, PDCMS, and the like, for example) that execute braking are executed. Accordingly, when the vehicle travels at a speed higher than the maximum speed, a driver assistance system that aims at more active control may be activated without performing the lateral movement control.

On the other hand, when the vehicle speed is higher than the maximum speed, a deceleration control may be further performed to reduce the vehicle speed below the maximum speed. For example, when the vehicle speed is higher than the maximum speed according to this condition, the lateral movement system for collision avoidance according to the present disclosure does not operate in principle. However, when the value obtained by subtracting the maximum speed from the vehicle speed is equal to or less than a predetermined value, a deceleration control may be performed to reduce the vehicle speed below the maximum speed. For example, when the maximum speed according to the speed condition is 13 m/s, the predetermined value is 5 m/s, and the vehicle speed is 17 m/s, a deceleration control may be performed to reduce the vehicle speed to lower than 13 m/s. Through such deceleration control, the degree of freedom of autonomous/semi-autonomous driving may be further raised by activating the lateral movement system for collision avoidance according to the present disclosure.

Figure 6:
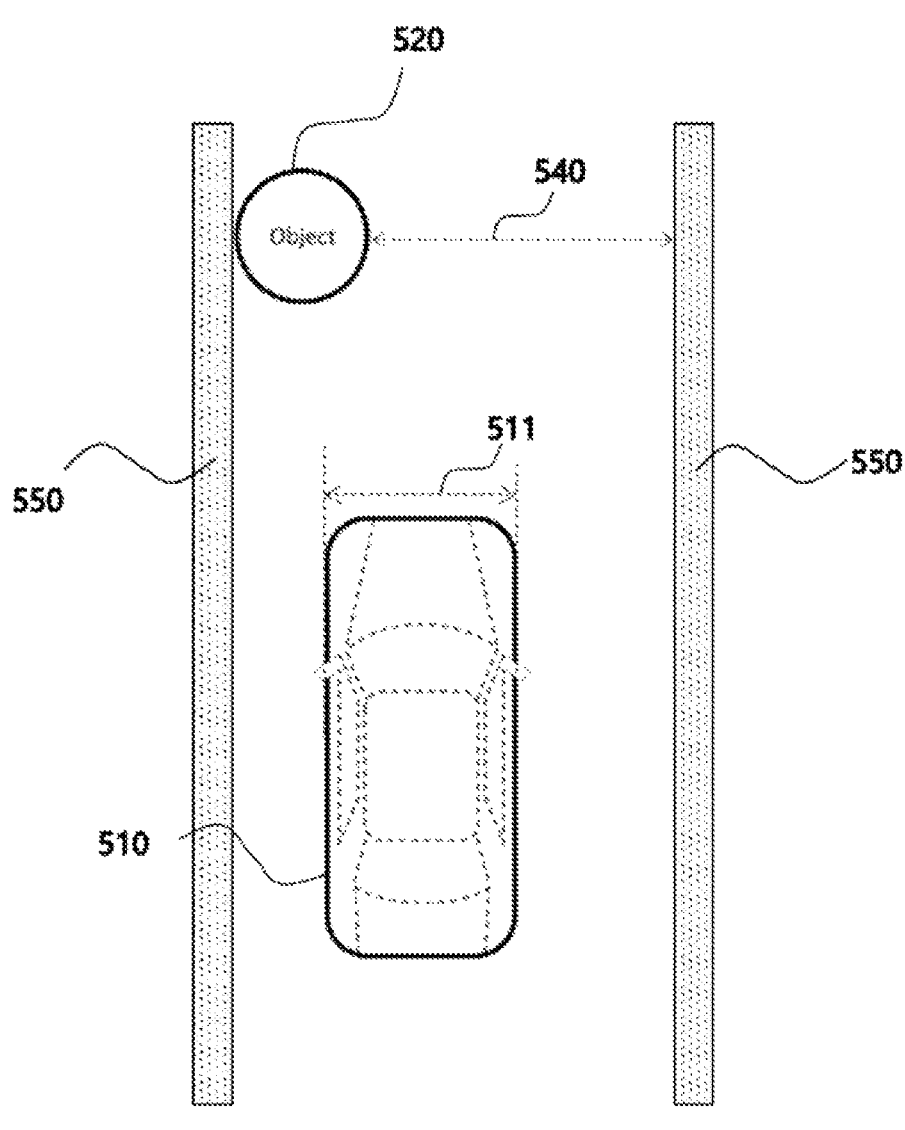
FIG. 6 is a view for describing an overtaking space condition according to the present disclosure.

Reference will be made to FIG. 6 to describe the overtaking space condition according to the present disclosure.

FIG. 6 is a view for describing an overtaking space condition according to the present disclosure. FIG. 6 shows a vehicle 510, an object 520, and two lane markings 550. The lane making lines 550 refer to the right and left lines defining a driving lane of the vehicle 510. As described above, the overtaking space condition is/states that the operation condition of the lateral movement system for collision avoidance is satisfied when the distance from the object 540 to the lane marking 550 is greater than the lateral length 511 of the vehicle 510. When a collision risk is detected, the lateral movement system for collision avoidance according to the present disclosure aims to avoid a collision and overtake the object to keep driving by steering alone with minimal active control while concurrently preventing a secondary collision with other vehicles or road topographic features, unlike other driver assistance systems (AEV, FVCMS, PDCMS, and the like, for example) that perform control involving braking. Accordingly, the lateral movement system for collision avoidance according to the present disclosure should execute the lateral movement while ensuring that the vehicle does not deviate from the lane in which the vehicle 510 is traveling. Accordingly, when the distance from the object 540 to the lane marking 550 is less than the lateral length 511 of the vehicle 510, the operation condition is not satisfied according to the overtaking space condition so that lateral movement is not executed. On the other hand, since there are two lane markings on the right and left sides of the object, there may be two distances 540 from the object to the lane markings, and it is generally preferable to judge the overtaking space condition based on the greater distance of the two distances. Alternatively, in the case of a small vehicle, the lateral length 511 of the vehicle 510 may be short, and thus, both the distances from the object to the right and left lane markings may satisfy the overtaking space condition. It may be judged that the overtaking space condition is satisfied in such a case.

Reference will be made to FIG. 7 to describe a lateral speed condition of an object according to the present disclosure.

FIG. 7 is a view for describing a lateral speed condition of an object according to the present disclosure. FIG. 7 shows a vehicle 710 and an object 720. As described above, the object 720 includes both a stationary object and a moving object. A moving object may have both a longitudinal speed and a lateral speed, and the lateral movement system for collision avoidance according to the present disclosure judges whether the condition is satisfied based on the lateral speed (V_obj_lat) without considering the longitudinal speed. As described above, the lateral movement condition of an object is that the operation condition of the lateral movement system for collision avoidance is satisfied when the lateral speed of the object is less than a predetermined speed. For example, the predetermined speed may be 2 km/h. Accordingly, when the lateral speed (V_obj_lat) of the object 720 is equal to or higher than 2 km/h, the operation condition is not satisfied so that the lateral movement control is not performed. Other driver assistance systems at a higher level may be activated by setting a lateral speed condition of an object as in the present disclosure. The lateral movement system for collision avoidance proposed in the present disclosure aims to achieve a movement to overtake an object by steering without executing the deceleration braking of the vehicle, and this is to achieve an autonomous/semi-autonomous driving with minimal control before other driver assistance systems (AEV, FVCMS, PDCMS, and the like, for example) that execute braking are executed. Accordingly, when the lateral movement speed of the object 720 (V_obj_lat) is higher than a predetermined speed, a driver assistance system that aims at more active control may be activated without performing the lateral movement control. In addition, the lateral speed condition has technical significance in that the collision avoidance operation is performed only when the lateral movement of the object is static. For example, in perceiving a pedestrian through a sensor, the reliability of the sensor may be low and the pedestrian may characteristically accelerate and decelerate abruptly. Accordingly, when the lateral movement speed of the object is higher than the predetermined speed (that is, when the lateral movement of the object is dynamic), performing the collision avoidance operation according to the present disclosure will rather pose a problem of increasing the likelihood of secondary collisions caused by a malfunction or erroneous control of the function.

Reference will be made to FIG. 2 to describe operation direction determination of the lateral movement system for collision avoidance. FIG. 2 shows that the lateral movement system for collision avoidance may be configured to determine an operation direction (230). For example, the lateral movement system for collision avoidance may include a processor and judge whether to steer the vehicle to the right or left when it is judged that the operation condition of the lateral movement system for collision avoidance is satisfied as described above.

Reference will be made to FIG. 8 to describe an operation direction determination according to the present disclosure.

FIG. 8 is a view for describing an operation direction determination according to the present disclosure. The lateral movement system for collision avoidance according to the present disclosure aims to avoid a collision between a vehicle and an object and minimize the collision risk by lateral movement alone before a more active driver assistance system that involves braking intervenes. In order to achieve this, the operation direction or the movement direction of the vehicle may be determined based on criteria including the following criteria.

Distances from the sensed object to the left lane making line and the right lane marking are judged so that the operation direction may be determined to be the direction having a greater distance. For example, when the distance from the object to the right lane marking is greater than the distance from the object to the left lane marking, the right direction may be determined to be the operation direction. Similarly, when the distance from the object to the right lane marking is less than the distance from the object to the left lane marking, the left direction may be determined to be the operation direction. Such a direction determination criterion allows the lateral movement in a direction in which collision possibility with an object decreases.

In addition, when another object in addition to a target object is detected, the direction in which the another object is not present may be determined to be the operation direction. For example, on a multi-lane road, there may be a preceding vehicle or a following vehicle in the right and left lanes. Accordingly, when another object such as another vehicle is detected, the direction in which the another object is not present may be determined to be the operation direction. Such a direction determination criterion allows removal of collision risk with the target object as well as secondary collision risk with the another object.

In addition, when a yellow line which is a center marking line is detected, the direction away from the center marking line may be determined to be the operation direction. For example, in the case of left-handed driving in which the driver's seat is installed on the left side of the vehicle as in Korea, the center marking line is located on the left side of the vehicle. When an object is detected while the vehicle travels in the first lane, the right direction away from the center marking line may be determined to be the operation direction. Such a direction determination criterion allows removal of collision risk with a vehicle traveling in the opposite lane.

In addition, when another object in addition to the target object is detected and the another object is judged to be a moving object, the direction away from the direction of the another object may be determined to be the operation direction. When the another object is a moving object, there is a possibility that the another object may enter the lane in which the vehicle is traveling due to its mobility, so that such a direction determination criterion allows removal of collision risk with the another object.

In addition, the direction toward a low-speed driving lane may be determined to be the operation direction. For example, in the case of the left-handed driving on an expressway, the left lane is a passing lane and the right lane is a low-speed driving lane by law. Accordingly, determining the low-speed driving lane to be the operation direction allows a decrease of secondary collision possibility and mitigation of collision severity even if a secondary collision occurs. In addition, when a driver intends to change directions, the intended direction may be determined to be the operation direction. For example, when an object is detected and the driver manipulates steering before, or even after, the lateral movement system for collision avoidance intervenes, the manipulation direction may be determined to be the operation direction. In this case, lateral movement may be executed with the aim of assisting the steering of a driver. That is, the driver's intended direction or manipulation direction may not be compromised.

Back to FIG. 2, the lateral movement system for collision avoidance may be configured to perform a lateral movement operation (240). For example, the lateral movement system for collision avoidance may include a processor and may output a control command when the operation direction of the lateral movement system for collision avoidance is determined as described above. The outputted control command may be transmitted to a controller executing the movement of the vehicle. For example, the control command may be transmitted to a steering controller and the steering controller may cause an actuator (a motor-driven power steering (MDPS), for example) controlling the steering of a vehicle to operate. Another example may be the control command being transmitted to the brake controller and the brake controller operating a side brake of the vehicle so that lateral movement of the vehicle is executed.

The performance of a lateral movement operation will be described with reference to FIG. 9.

Figure 9:
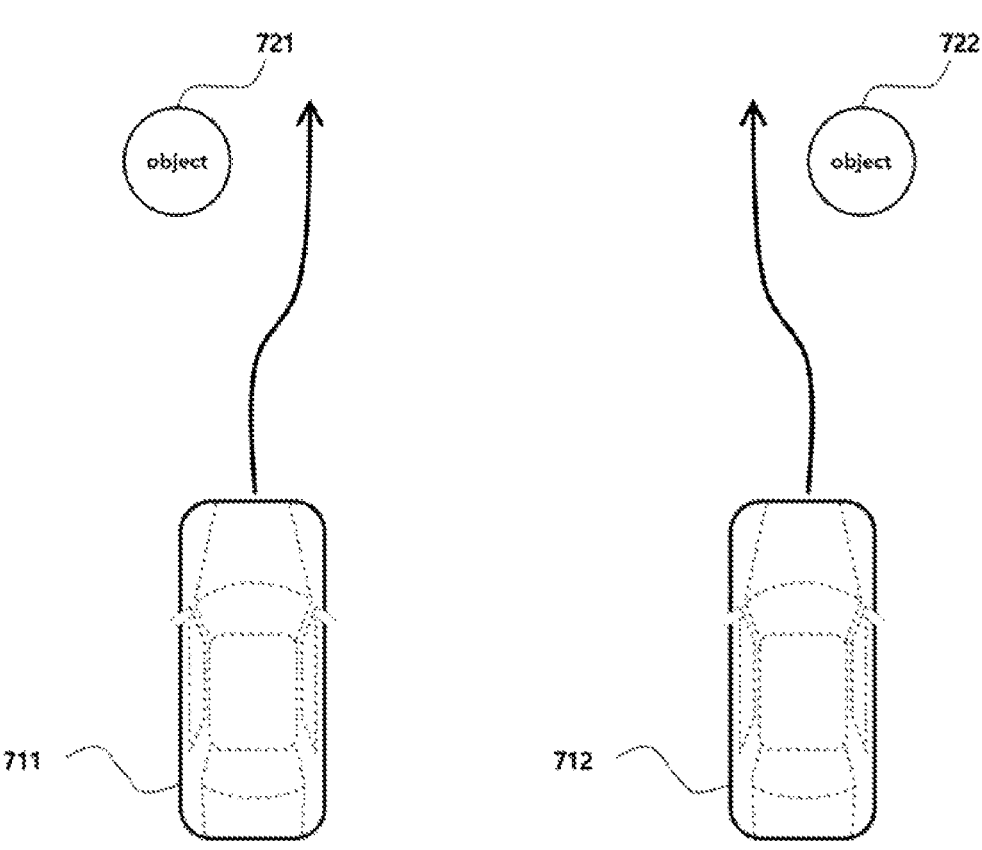
FIG. 9 is a view for describing a lateral movement operation according to the present disclosure.

FIG. 9 is a view for describing a lateral movement operation according to the present disclosure. FIG. 9 shows a vehicle 711 executing lateral avoidance to the right and a vehicle 712 executing lateral avoidance to the left.

The vehicle 711 may detect a forward object 721 and determine the right direction to be the operation direction when the operation condition is satisfied. Accordingly, the vehicle executes lateral movement to the right and a collision with the object 721 may be avoided.

Similarly, the vehicle 712 may detect a forward object 722 and determine the left direction to be the operation direction when the operation condition is satisfied. Accordingly, the vehicle executes lateral movement to the left and a collision with the object 722 may be avoided.

The lateral movement system for collision avoidance proposed in the present disclosure aims to achieve a movement to overtake an object by steering without executing the deceleration braking of the vehicle. This is to achieve an autonomous/semi-autonomous driving with minimal control before other driver assistance systems (AEV, FVCMS, PDCMS, and the like, for example) that execute braking are executed. Accordingly, collision risk may be removed without compromising the driving comfort of the occupants through minimal movement control before braking which is an active control is executed.

FIG. 10 is a view for describing two types of lateral movement systems for collision avoidance according to the present disclosure.

The lateral movement system for collision avoidance according to the present disclosure may include a first type (type 1) and a second type (type 2).

The first type refers to a type in which the system is automatically initiated without a trigger of a driver, while the second type refers to a type in which the system is initiated by a trigger of a driver. Specifically, in the first type, the system automatically intervenes when a collision with an object is imminent and the driver does not respond to the object. The system according to the first type may judge whether the operation condition is satisfied, determine the movement direction when the operation condition is satisfied, and execute the lateral movement of the vehicle in the determined movement direction. In the second type, the system is initiated by the driver triggers the system, judges whether the operation condition is satisfied, determines the movement direction to follow the driver's intended direction or manipulation direction when the operation condition is satisfied, and generates auxiliary steering torque when the driver's steering torque is insufficient to avoid a collision.

The operation condition according to the first type may include at least one of the overlap condition, the vehicle speed condition, the overtaking space condition, and the lateral speed condition of the object. In contrast, the operation condition according to the second type may include at least one of the overlap condition, the vehicle speed condition, and the overtaking space condition. Each condition is the same as the condition described above with reference to FIGS. 3 to 7. Specifically, in the first type, the system automatically starts a lateral avoidance operation without a trigger of a driver so that determining whether or not to intervene does not require judgment on the lateral speed of the object as a precondition. As described above, the collision avoidance operation is performed when the lateral movement speed of the object is lower than a predetermined speed, but the collision avoidance operation is not performed when the lateral speed of the object is higher than a predetermined speed. For example, the predetermined speed may be 2 k/m. The lateral speed condition applied to such first type has technical significance in that collision avoidance operation is performed only in a state where the lateral movement of the object is static. For example, in perceiving a pedestrian through a sensor, the reliability of the sensor may be low and the pedestrian may characteristically accelerate and decelerate abruptly. Accordingly, when the lateral movement speed of the object is higher than the predetermined speed (i.e., when the lateral movement of the object is dynamic), performing the collision avoidance operation according to the present disclosure will rather pose a problem of increasing the likelihood of secondary collisions caused by a malfunction or erroneous control of the function. On the other hand, in the second type, the system assists the lateral avoidance operation by the trigger of the driver so that the lateral movement speed condition is unnecessary as a prerequisite.

However, the maximum speed in the vehicle speed condition may be set higher in the second type than in the first type. Specifically, in the first type, the processing of determining the movement direction is performed when an object is detected, while, in the second type, the processing of determining the movement direction is not performed and the driver's manipulation direction or intended direction is determined to be the movement direction. In addition, the first type has more types, and a greater number, of sensors to be activated to sense a target object, another object, and lane markings to determine the movement direction than the second type. Accordingly, a delay may occur before the system is initiated in the case of the first type while the delay occurring in the second type is minimal. Accordingly, in the first type, the collision risk caused by the delay may be reduced by setting low the maximum speed, at which the operation starts.

The movement direction may be determined based on at least one of a plurality of criteria in the first type. In contrast, the movement direction may be determined to be the driver's intended direction or manipulation direction in the second type. Specifically, in the first type, distances from the sensed object to the left lane marking and the right lane marking are judged so that the operation direction may be determined to be the direction having a greater distance. For example, when the distance from the object to the right lane marking is less than the distance from the object to the left lane marking, the left direction may be determined to be the operation direction. In addition, when another object in addition to the target object is detected, the direction in which the another object is not present may be determined to be the operation direction. In addition, when a yellow line which is the center marking line is detected, the direction away from the center marking line may be detected to be the operation direction. In addition, when another object in addition to the target object is detected and the another object is judged to be a moving object, the direction away from the direction of the another object may be determined to be the operation direction. In addition, the direction toward a low-speed driving lane may be determined to be the operation direction. Such movement direction determinations are the same as described above with reference to FIG. 8.

The amount of lateral movement according to the first type may be restricted. For example, when there are lane markings, the lateral movement may be executed within a range not to cross a lane marking. When there is no lane marking, the maximum amount of lateral movement may be less than a predetermined value. For example, the maximum amount of lateral movement may be set at 7.5 m. In contrast, the amount of lateral movement according to the second type may not be restricted. This is because the lateral movement picks up a lacking amount of driver's steering torque in the case of the second type and the insufficiency of steering torque calls for continued support for the lateral movement.

Figure 11:
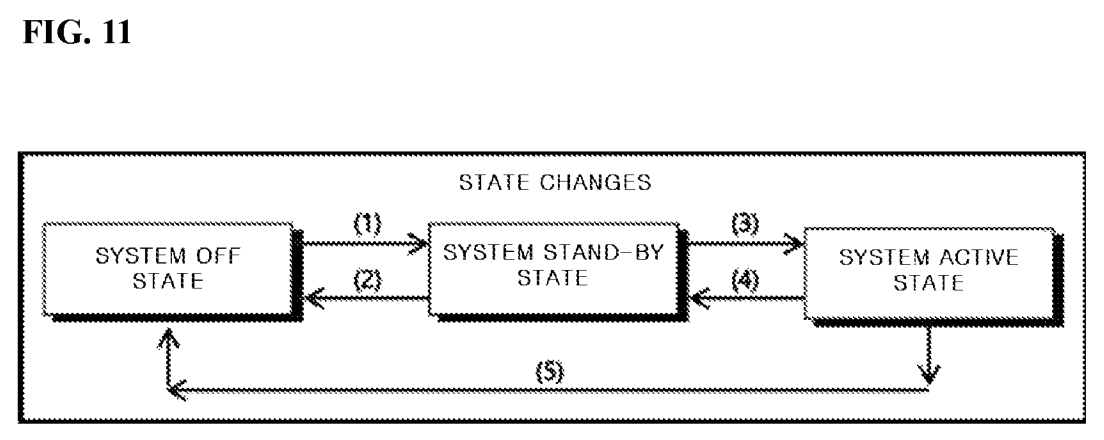

FIG. 11 is a block diagram for describing state changes of a lateral movement system for collision avoidance according to the present disclosure.

FIG. 11 shows that the system according to the present disclosure may include three states: a system off state, a system standby state, and a system active state.

The system off state is an initial state before the system changes to the standby state. The system standby state is a state in which the system is on but not activated and is ready for activation. The system active state is a state in which the operation condition is satisfied and movement direction determination or lateral movement is executed.

Specifically, the change (1) refers to a change from the system off state to the system standby state, and this may be a case where the ignition of the vehicle is turned on without a system failure. In some cases, if the vehicle is equipped with a switch configured to control the on/off of the system, the ignition of the vehicle may be turned on, there may be no system failure and the system may not be turned off by the driver's manipulation.

The change (2) refers to a change from the system standby state to the system off state, and this may be a case where the ignition of the vehicle is turned off or a system failure has occurred. In some cases, if the vehicle is equipped with a switch configured to control the on/off of the system, the system may be turned off by the driver's manipulation.

The change (3) refers to a change from the system standby state to the system active state. As described above, in the case of the first type, this may be a case where the system detects an object, avoidance operation by a driver is not detected, and the operation condition is satisfied. In the second type as described above, this may be a case where the system detects an object, the driver activates the system, and the operation condition is satisfied.

The change (4) refers to a change from the system active state to the system standby state. In the case of the first type as described above, this may be a case where lateral movement is completed, may be a case where there is an override by the driver, or may be a case where the satisfaction of the operation condition is cancelled. In the case of the second type as described above, this may be a case where lateral movement is completed or may be a case where the satisfaction of the operation condition is cancelled.

The change (5) refers to a change from the system active state to the system off state. This may include a case where a system failure occurs or a case where the ignition of the vehicle is turned off.

The above-described operations of the lateral movement system or the operations with respect to the processor 20 may be implemented as software or algorithm stored on a non-transitory computer readable medium, such as a RAM memory, a flash memory, a ROM, memory an erasable and programmable ROM (EPROM), an electrically EPROM (EEPROM), a register, a hard disc, a solid state drive (SSD), a removable disc, and a compact disc-ROM (CD-ROM). When the processor 20 (or the lateral movement system) executes the software or algorithm, the processor (or the lateral movement system) may be configured to perform the above-described operations.

What is claimed is:

1. A lateral movement system for collision avoidance comprising:

a plurality of sensors detecting a forward object;

a processor judging an operation condition based on information about the forward object, determining a direction of lateral movement, and outputting a lateral movement command based on the direction of lateral movement; and an actuator executing lateral movement of a vehicle upon receiving the lateral movement command, wherein the operation condition includes an overtaking space condition to be satisfied when a distance from the forward object to a lane marking is greater than a lateral length of the vehicle, wherein the processor is configured to determine the direction of lateral movement based on the determining of an operation direction to be a direction having a greater distance from among distances from the forward object to a left lane marking and a right lane marking, wherein the processor is operated to output a lateral movement command to control the lateral movement to be restricted within a limited range not to cross a lane marking when there is a lane marking and output a lateral movement command to control the lateral movement to be less than a predetermined movement amount when there is no lane marking, wherein the vehicle includes a first type in which the system is automatically initiated without a trigger of a driver and a second type in which the system is initiated based on a trigger of a driver, and wherein the operation condition of the vehicle operating according to the first type includes a lateral speed condition of the forward object to be satisfied when the lateral speed of the forward object is lower than a predetermined speed, and the operation condition of the vehicle operating according to the second type does not include the lateral speed condition of the forward object.

2. The system of claim 1, wherein the operation condition includes an overlap condition to be satisfied when a ratio of a lateral overlap of the vehicle and the forward object with respect to an overall width of the vehicle is equal to or greater than a minimum ratio.

3. The system of claim 1, wherein the operation condition includes a vehicle speed condition to be satisfied when movement speed of the vehicle is equal to or higher than a minimum speed and equal to or lower than a maximum speed.

4. The system of claim 3, wherein the processor outputs a command to control the vehicle to decelerate so that the movement speed of the vehicle becomes equal to or lower than the maximum speed.

5. The system of claim 1, wherein the operation condition includes a lateral speed condition to be satisfied when a lateral speed of the forward object is lower than a predetermined speed.

6. The system of claim 1, wherein the operation condition includes a vehicle speed control to be satisfied when movement speed of the vehicle is equal to or higher than a minimum speed and equal to or lower than a maximum speed, and the maximum speed set in the second type is higher than the maximum speed set in the first type.

7. The system of claim 1, wherein the processor of the vehicle operating according to the first type determines the direction of lateral movement based on at least one of the determining of an operation direction to be a direction in which, when another moving object in addition to a target object is detected, the another moving object is not present;

the determining of an operation direction to be a direction away from a center making line;

when the another moving object in addition to the target object is detected, the determining of an operation direction to be a direction away from a direction of the another moving object; and the determining of an operation direction to be a direction toward a slow-speed driving lane.

8. The system of claim 1, wherein the processor of the vehicle operating according to the second type determines the direction of lateral movement based on the driver's steering manipulation direction alone.

9. The system of claim 1, wherein a state of the processor includes at least one of a system off state, a system standby state, and a system active state.

10. A lateral movement system for collision avoidance comprising:

a plurality of sensors configured to detect a forward object;

a processor configured to:

judge an operation condition based on at least information about the forward object, determine a direction of lateral movement in response to determining that the operation condition indicates that a vehicle speed condition is satisfied when movement speed of a vehicle is equal to or higher than a minimum speed and equal to or lower than a maximum speed and that an overtaking space condition is satisfied when a distance from the forward object to a lane marking is greater than a lateral length of the vehicle, and output a lateral movement command based on the direction of lateral movement; and an actuator configured to execute lateral movement of the vehicle upon receiving the lateral movement command without a braking operation, wherein the processor is configured to determine the direction of lateral movement based on the determining of an operation direction to be a direction having a greater distance from among distances from the forward object to a left lane marking and a right lane marking, and wherein the processor is operated to output a lateral movement command to control the lateral movement to be restricted within a limited range not to cross a lane marking when there is a lane marking and output a lateral movement command to control the lateral movement to be less than a predetermined movement amount when there is no lane marking, wherein the vehicle includes a first type in which the system is automatically initiated without a trigger of a driver and a second type in which the system is initiated based on a trigger of a driver, and wherein the operation condition of the vehicle operating according to the first type includes a lateral speed condition of the forward object to be satisfied when the lateral speed of the forward object is lower than a predetermined speed, and the operation condition of the vehicle operating according to the second type does not include the lateral speed condition of the forward object.

* * * * *